(12) United States Patent
Tsai (10) Patent No.: US 11,038,447 B2
(45) Date of Patent: Jun. 15, 2021

(54) SYSTEM AND METHOD FOR DRIVING MOTOR WITH FREQUENCY CONVERSION MECHANISM

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 50 days.

(21) Appl. No.: 16/738,849

(22) Filed: Jan. 9, 2020

(65) Prior Publication Data

US 2021/0083606 A1 Mar. 18, 2021

(30) Foreign Application Priority Data

Sep. 17, 2019 (TW) .................................. 108133342

(51) Int. Cl.
*H02P 6/182* (2016.01)
*H02P 7/08* (2006.01)

(52) U.S. Cl.
CPC ................ *H02P 6/182* (2013.01); *H02P 7/08* (2013.01)

(58) Field of Classification Search
CPC ............. H02P 6/182; H02P 7/08; H02P 23/22
See application file for complete search history.

(56) References Cited

U.S. PATENT DOCUMENTS

| 5,359,154 | A | * | 10/1994 | Tsukasa | ..................... | H02P 5/50 177/145 |
| 6,420,847 | B1 | * | 7/2002 | Galbiati | ................... | H02P 6/182 318/400.33 |
| 8,450,959 | B2 | * | 5/2013 | Chien | ....................... | H02P 6/24 318/400.35 |
| 2012/0146566 | A1 | * | 6/2012 | Takeuchi | ................. | H03K 7/08 318/503 |
| 2014/0167668 | A1 | * | 6/2014 | Ko | .......................... | H02P 6/182 318/400.35 |
| 2017/0346420 | A1 | * | 11/2017 | Ross | ....................... | H02P 6/182 |

* cited by examiner

*Primary Examiner* — Bickey Dhakal
(74) *Attorney, Agent, or Firm* — Li & Cai Intellectual Property (USA) Office (57) ABSTRACT

A system and a method for driving a motor with a frequency conversion mechanism are provided. The system includes a look-up table module, an oscillator circuit, a multi-frequency signal generator circuit, and a motor driver circuit. The look-up table module stores a preset driving signal. The oscillator circuit generates oscillating signals having different frequencies. The multi-frequency signal generator circuit outputs a multi-frequency signal according to the oscillating signals. One waveform segment of the multi-frequency signal in a modulation region has a first oscillating frequency. Another waveform segment of the multi-frequency signal outside the modulation region has a second oscillating frequency lower than the first oscillating frequency. When a back electromotive force or a phase current of the motor reaches zero within a time interval of the modulation region, the motor driver circuit drives the motor according to the preset driving signal and the multi-frequency signal.

8 Claims, 7 Drawing Sheets

SYSTEM AND METHOD FOR DRIVING MOTOR WITH FREQUENCY CONVERSION MECHANISM

CROSS-REFERENCE TO RELATED PATENT APPLICATION

This application claims the benefit of priority to Taiwan Patent Application No. 108133342, filed on Sep. 17, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system and a method for driving a motor, and more particularly to a system and a method for driving a motor with a frequency conversion mechanism.

BACKGROUND OF THE DISCLOSURE

In general, a position sensor detector such as a Hall sensor, an optical encoder and the like is often used to detect a position of a rotor of a DC brushless motor; and accordingly, a phase switching signal is inputted to the DC brushless motor to drive the DC brushless motor to rotate normally. However, the position sensor must be disposed in the DC brushless motor such that a size, a difficulty in assembly, and a cost of the DC brushless motor increase. That is, in response to a trend of which motors are now smaller, an application of the DC brushless motor is limited by the position sensor.

In order to reduce the size of the DC brushless motor occupying a system and the difficulty in assembly thereof, DC brushless motors without any sensor are widely used in various driver products. Many conventional driver devices of the DC brushless motors determine the position of the rotor and switch the rotor to any other phases of the DC brushless motor according to a back electromotive force (BEMF) induced by a stator of the DC brushless motor. In addition, a conventional architecture of driver devices switches the rotor to any other phases of the DC brushless motor based on a phase current of the motor. However, a zero value of the back electromotive force or the phase current of zero may not be detected immediately in the above-mentioned manners.

SUMMARY OF THE DISCLOSURE

In response to the above-referenced technical inadequacies, the present disclosure provides a system for driving a motor with a frequency conversion mechanism. The system includes a look-up table module, an oscillator circuit, a multi-frequency signal generator circuit, and a motor driver circuit. The look-up table module is configured to store a preset driving signal. The oscillator circuit is configured to generate a plurality of oscillating signals having different frequencies from each other. The multi-frequency signal generator circuit is connected to the look-up table module and the oscillator circuit. The multi-frequency signal generator circuit is configured to transmit the preset driving signal and output a multi-frequency signal according to the oscillating signals. One waveform segment of the multi-frequency signal in a frequency modulation region has a first oscillating frequency. Another waveform of the multi-frequency signal outside the frequency modulation region has a second oscillating frequency lower than the first oscillating frequency. The motor driver circuit is connected to the multi-frequency signal generator circuit. The motor driver circuit is configured to output a driving signal to the motor to drive the motor according to the preset driving signal and the multi-frequency signal when the motor driver circuit detects that a back electromotive force or a phase current of the motor reaches zero within a time interval of the frequency modulation region.

In certain embodiments, the multi-frequency signal generator circuit is configured to redefine the frequency modulation region according to a region adjusting request.

In certain embodiments, the system further includes a detector circuit configured to detect the back electromotive force or the phase current of the motor within the time interval of the frequency modulation region.

In certain embodiments, when the detector circuit detects that the back electromotive force or the phase current of the motor reaches zero at a time point in the frequency modulation region of the multi-frequency signal, the time point is spaced apart from a starting time point of the frequency modulation region by an angle on a waveform of the multi-frequency signal, and the time point is spaced apart from a ending time point of the frequency modulation region at the angle on the waveform of the multi-frequency signal.

In addition, the present disclosure provides a method for driving a motor with a frequency conversion mechanism. The method includes the following steps: storing a preset driving signal by a look-up table module; generating a plurality of oscillating signals having different frequencies from each other by an oscillator circuit; outputting a multi-frequency signal according to the oscillating signals by a multi-frequency signal generator circuit, wherein one waveform segment of the multi-frequency signal in a frequency modulation region has a first oscillating frequency, and another waveform of the multi-frequency signal outside the frequency modulation region has a second oscillating frequency lower than the first oscillating frequency; transmitting the preset driving signal by the multi-frequency signal generator circuit; and outputting a driving signal, by a motor driver circuit, to drive the motor according to the preset driving signal and the multi-frequency signal when detecting that a back electromotive force or a phase current of the motor reaches zero within a time interval of the frequency modulation region.

In certain embodiments, the method further includes the following step: redefining the frequency modulation region according to a region adjusting request by the multi-frequency signal generator circuit.

In certain embodiments, the method further includes the following step: detecting the back electromotive force or the phase current of the motor within the time interval of the frequency modulation region by a detector circuit.

In certain embodiments, the method further includes the following step: detecting that the back electromotive force or the phase current of the motor reaches zero at a time point in the frequency modulation region of the multi-frequency signal by a detector circuit, wherein the time point is spaced apart from a starting time point of the frequency modulation region at an angle on a waveform of the multi-frequency signal, and the time point is spaced apart from a ending time point of the frequency modulation region at the angle on the waveform of the multi-frequency signal.

As described above, the present disclosure provides the system and the method for driving the motor with the frequency conversion mechanism. The system uses the oscillator circuit to generate the plurality of oscillating signals having different frequencies, and outputs the multi-frequency signal having a high-frequency waveform segment and a low-frequency waveform segment according to the oscillating signals. The phase current and the back electromotive force of the motor are detected with a high detection frequency and a high detection resolution within the time interval of the high-frequency waveform segment. Therefore, the phase current and the back electromotive force can be detected accurately and instantaneously as parameter conditions for driving the motor, thereby improving an operating efficiency of the motor.

When this detection operation is not performed, the low-frequency waveform segment is provided such that a switching loss and a power consumption can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
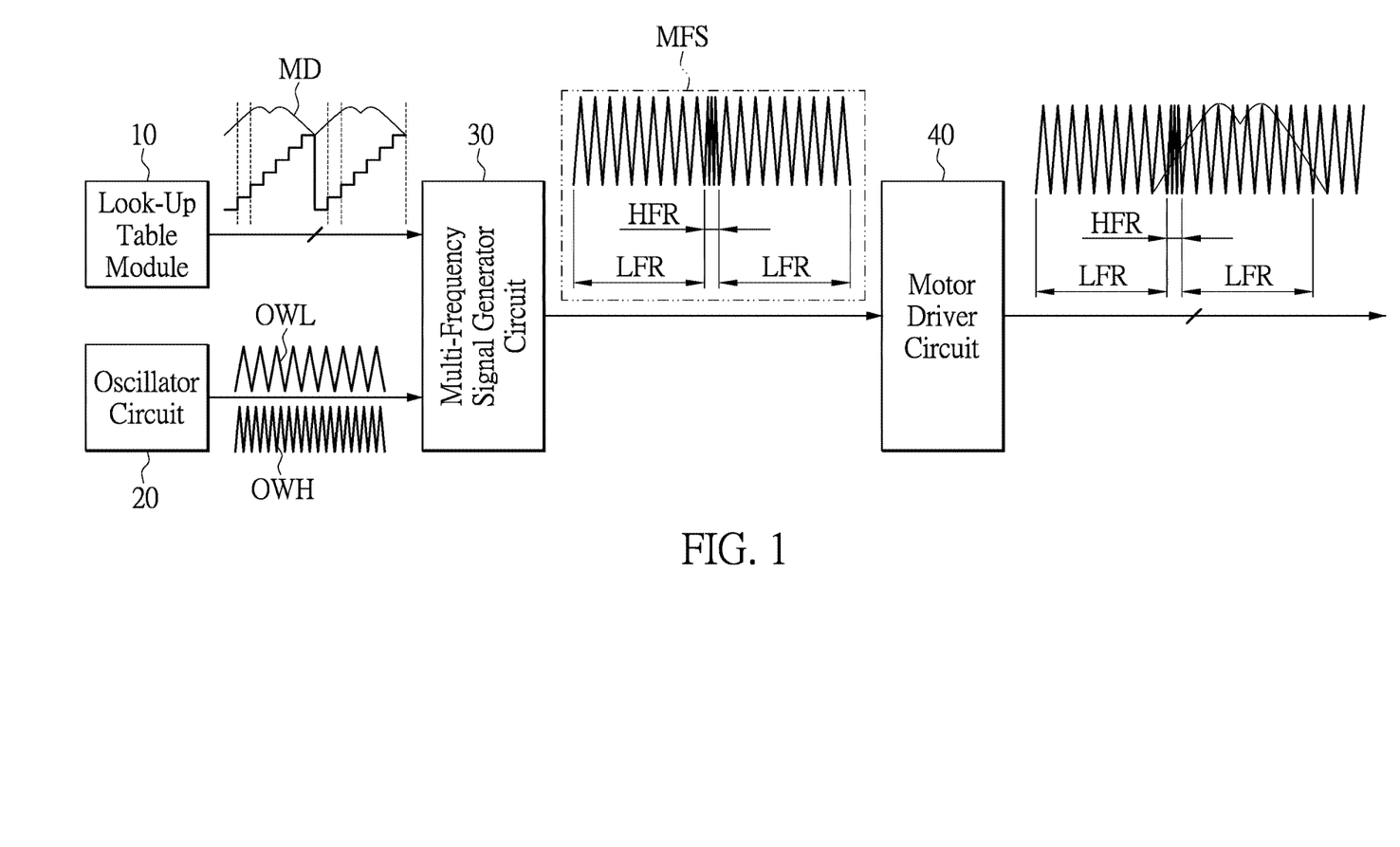
FIG. 1 is a block diagram of a system for driving a motor with a frequency conversion mechanism according to an embodiment of the present disclosure.

Reference is made to FIG. 1, which is a block diagram of a system for driving a motor with a frequency conversion mechanism according to an embodiment of the present disclosure. As shown in FIG. 1, in the embodiment, the system includes a look-up table module 10, an oscillator circuit 20, a multi-frequency signal generator circuit 30, and a motor driver circuit 40. The multi-frequency signal generator circuit 30 is connected to the look-up table module 10 and the oscillator circuit 20. The motor driver circuit 40 is connected to the multi-frequency signal generator circuit 30.

The look-up table module 10 may be a look-up table, but in practice, it may be replaced by a database, a register, a memory, or other components having storing function, but the present disclosure is not limited thereto. The look-up table module 10 is configured to store a preset driving signal MD. For example, the preset driving signal MD may have one or more sine waveforms, third-order harmonic waveforms, or other waveforms, but the present disclosure is not limited thereto.

The oscillator circuit 20 is configured to generate a plurality of oscillating signals having different frequencies from each other. In the embodiment, the oscillator circuit 20 generates a first oscillating signal OWH and a second oscillating signal OWL. For example, the first oscillating signal OWH and the second oscillating signal OWL may have triangular waveforms, but the present disclosure is not limited thereto. The first oscillating signal OWH may be a high-frequency oscillating signal and has a first oscillating frequency. The second oscillating signal OWL may be a low-frequency oscillating signal and has a second oscillating frequency. The first oscillating frequency of the first oscillating signal OWH is higher than the second oscillating frequency of the second oscillating signal OWL.

The multi-frequency signal generator circuit 30 is configured to output a multi-frequency signal MFS according to the first oscillating signal OWH and the second oscillating signal OWL from the oscillator circuit 20. For example, the multi-frequency signal generator circuit 30 defines a frequency modulation region HFR in which one waveform segment of a waveform of the first oscillating signal OWH is. The multi-frequency signal generator circuit 30 modulates a frequency of the one waveform segment in the frequency modulation region HFR to generate the multi-frequency signal MFS. The multi-frequency signal MFS has the first oscillating frequency in the frequency modulation region HFR, and has the second oscillating frequency outside the frequency modulation region HFR. A general oscillating signal only has a single frequency. In contrast, in the embodiment, a waveform of the multi-frequency signal MFS may have two or more frequencies in practice.

The present disclosure is not limited to the first oscillating signal OWH and the second oscillating signal OWL provided in the embodiment. In practice, the multi-frequency signal generator circuit 30 may obtain more oscillating signals and define more frequency modulation regions. The multi-frequency signal generator circuit 30 may modulate frequencies of waveform segments in a plurality of frequency modulation regions according to a plurality of oscillating signals respectively such that the multi-frequency signal MFS has more frequencies.

The system in the embodiment may further include a detector circuit (not shown in the figures), which is configured to detect a back electromotive force or a current of each coil of three phases of the motor within a time interval of the frequency modulation region. The multi-frequency signal generator circuit 30 may redefine or adjust an angular range and a width of the frequency modulation region in the multi-frequency signal MFS to redefine a time interval within which the motor is detected.

Figure 6:
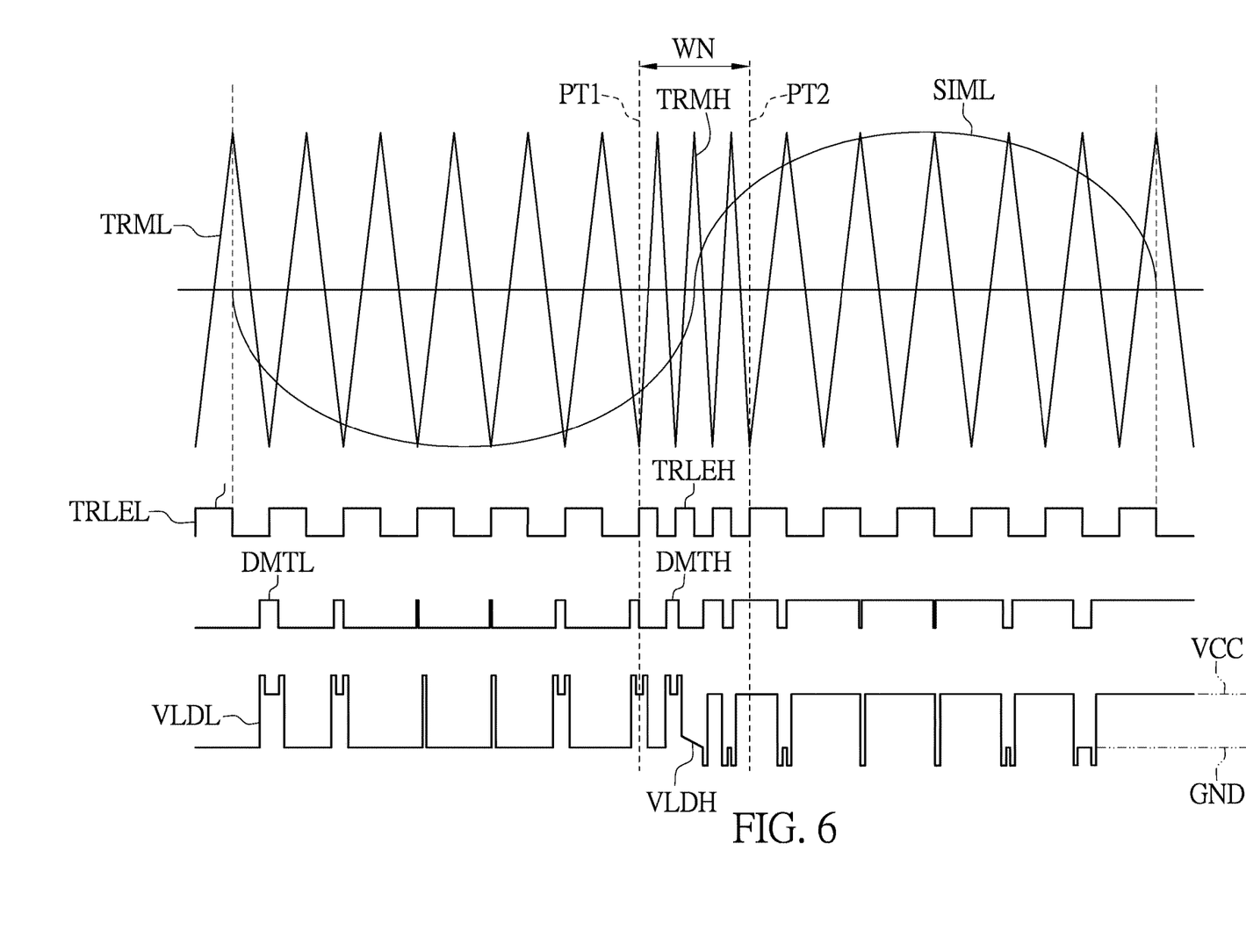
FIG. 6 is a waveform diagram of a triangular wave signal, a sine wave signal, a triangular wave level signal, a motor driving signal, and a node voltage signal of the motor that are provided by the system and method for driving the motor with the frequency conversion mechanism according to the embodiment of the present disclosure.

If the motor is operated at a normal speed such as a low rotating speed of 50 Hz in a normal operation mode, a low power consumption can be maintained. The frequency of the waveform segment of the multi-frequency signal MFS in the frequency modulation region increases, for example, to 100 HZ within the time interval within which the motor is detected, such that the detector circuit can accurately detect the back electromotive force or the current of the motor. Therefore, the detector circuit has a high detection frequency and a high resolution, and can immediately detect that the back electromotive force or the current of the motor reaches zero. When the detector circuit detects that the back electromotive force or the current of the motor reaches zero, a complete sine waveform or a third-order harmonic waveform can be immediately inputted to the motor. Alternatively, after waiting for a preset time, for example, after a time of the frequency modulation region ends (e.g., at a time point PT2 of a frequency modulation region WN as shown in FIG. 6), the complete sine waveform or the third-order harmonic waveform can be inputted to the motor. Therefore, an operating efficiency of the motor can be improved.

Figure 2:
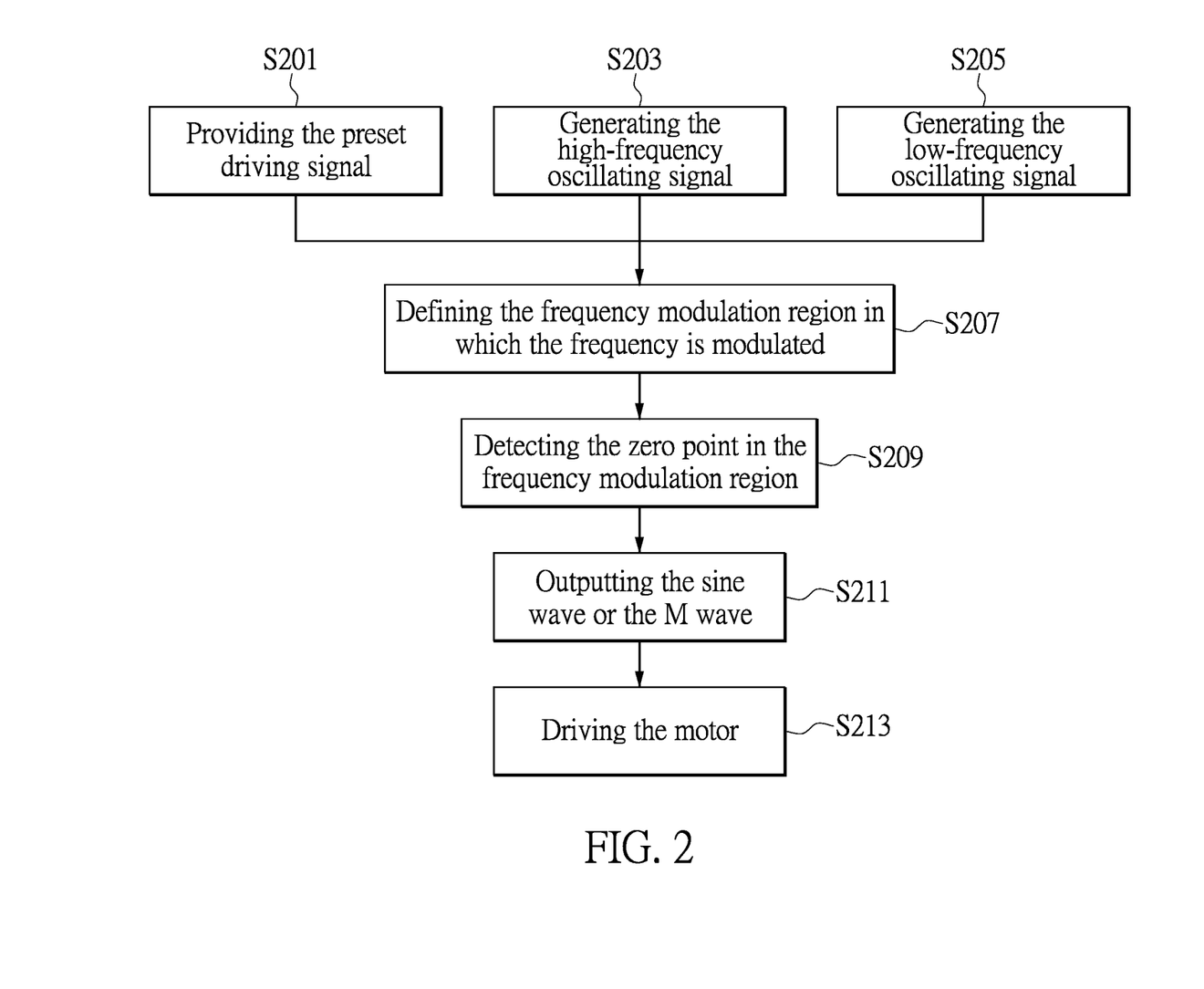
FIG. 2 is a flowchart diagram of a method for driving the motor with the frequency conversion mechanism according to the embodiment of the present disclosure.

Reference is made to FIGS. 1 and 2, wherein FIG. 2 is a flowchart diagram of a method for driving the motor with the frequency conversion mechanism according to the embodiment of the present disclosure. As shown in FIG. 2, in the embodiment, the method for driving the motor with the frequency conversion mechanism includes steps S201 to S213 for the above-mentioned system.

In step S201, the look-up table module 10 provides the preset driving signal MD stored therein to the multi-frequency signal generator circuit 30. For example, the preset driving signal MD has the sine waveform or the third-order harmonic waveform.

In step S203, the oscillator circuit 20 generates the first oscillating signal OWH that is the high-frequency oscillating signal, and supplies it to the multi-frequency signal generator circuit 30.

In step S205, the oscillator circuit 20 generates the second oscillating signal OWL that is the low-frequency oscillating signal, and supplies it to the multi-frequency signal generator circuit 30.

In step S207, the multi-frequency signal generator circuit 30 outputs the multi-frequency signal MFS according to the first oscillating signal OWH and the second oscillating signal OWL. One waveform segment of the multi-frequency signal MFS in the frequency modulation region has the high oscillating frequency. Another waveform segment of the multi-frequency signal MFS outside the frequency modulation region has the low oscillating frequency.

In step S209, the detector circuit included in the motor driver circuit 40 or an additional detector circuit detects whether or not the back electromotive force or the current of the motor reaches zero within the time interval of the frequency modulation region.

In step S211, when the back electromotive force or the current of the motor reaches zero, the motor driver circuit 40 generates a driving signal having a square wave or a pulse wave, according to the preset driving signal MD such as a sine waveform or a third-order harmonic waveform and the multi-frequency signal MFS such as a triangular wave.

In step S213, the motor driver circuit 40 outputs the driving signal to drive the motor to rotate.

Figure 3:
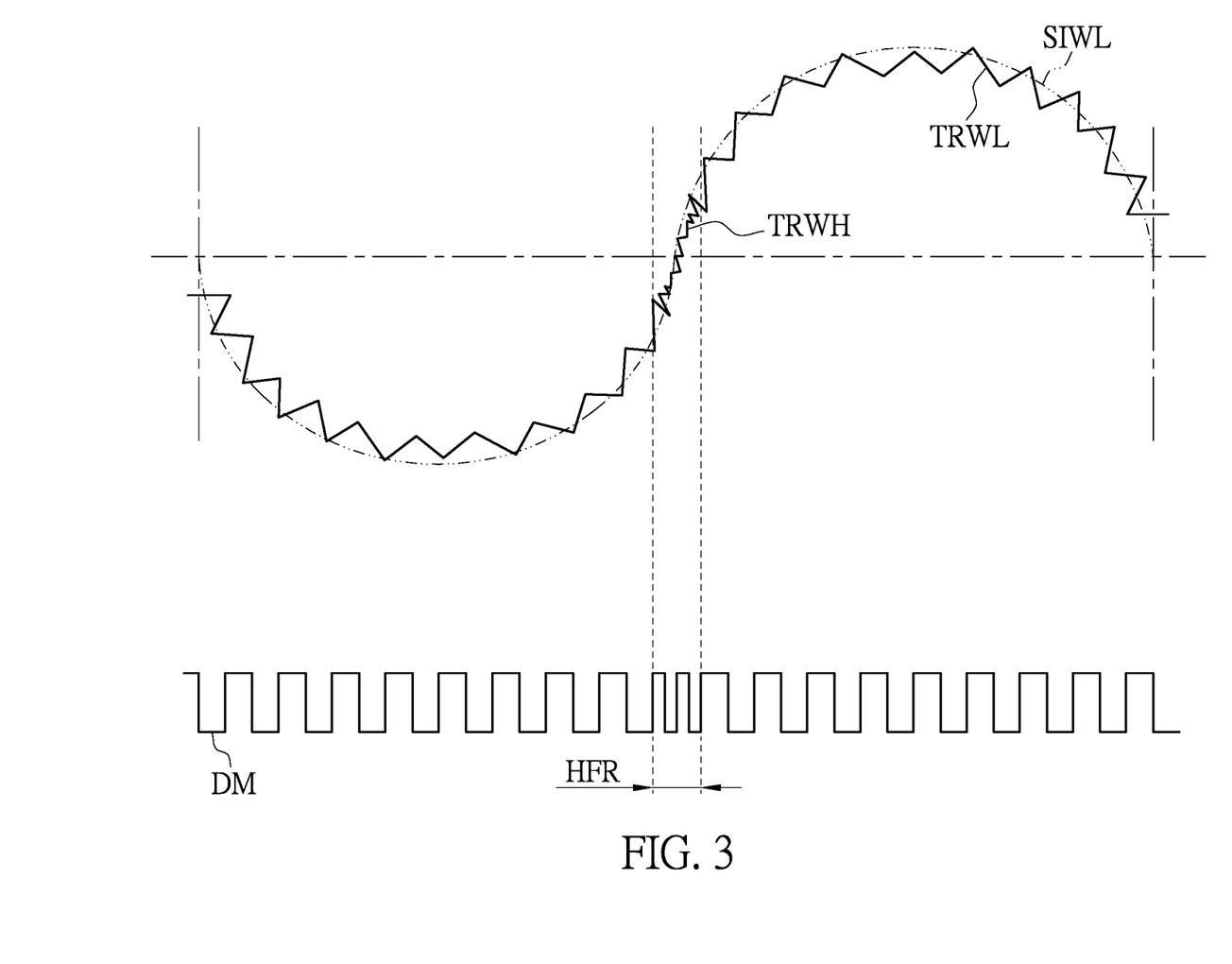
FIG. 3 is a waveform diagram of one cycle of a multi-frequency signal generated by modulating a frequency of an oscillating signal in a frequency modulation region by the system and method for driving the motor with the frequency conversion mechanism according to the embodiment of the present disclosure.

Reference is made to FIGS. 1 and 3, wherein FIG. 3 is a waveform diagram of one cycle of a multi-frequency signal generated by modulating a frequency of an oscillating signal in a frequency modulation region by the system and method for driving the motor with the frequency conversion mechanism according to the embodiment of the present disclosure.

If the frequency of the triangular waveform is too high, a switching loss is generated during switching between the upper bridge switch and the lower bridge switch that are connected to each of the phases of the motor, especially for a motor having discrete components such as a discrete MOSFET device. If zero points of the back electromotive force and the current of the motor are intended to be accurately detected to determine how to drive the motor, the triangular waveform must have a high frequency.

Therefore, as shown in FIG. 3, the triangular waveform of the multi-frequency signal generated by the multi-frequency signal generator circuit 30 has a high-frequency waveform segment TRWH in the frequency modulation region HFR and a low-frequency waveform segment TRWL outside the frequency modulation region HFR. That is, the zero points of the back electromotive force and the current of the motor are detected within the time interval of the frequency modulation region HFR. In contrast, when the zero point of the back electromotive force and the current is not detected, the low-frequency waveform segment TRWL is provided for reducing the switching loss.

A preset driving signal SIWL stored in the look-up table module 10 has a sine waveform, or it is replaced with a third-order harmonic waveform in practice. The motor driver circuit 40 compares the preset driving signal SIWL with the multi-frequency signal having the waveform segments TRWH and TRWL to output a driving signal DM having a square waveform or a pulse waveform to the motor to drive the motor. In other words, the driving signal DM may be a pulse width modulation signal, waveforms of which have different frequencies. A frequency of a pulse wave in the frequency modulation region HFR is higher than a frequency of a pulse wave outside the frequency modulation region HFR.

Figure 4:
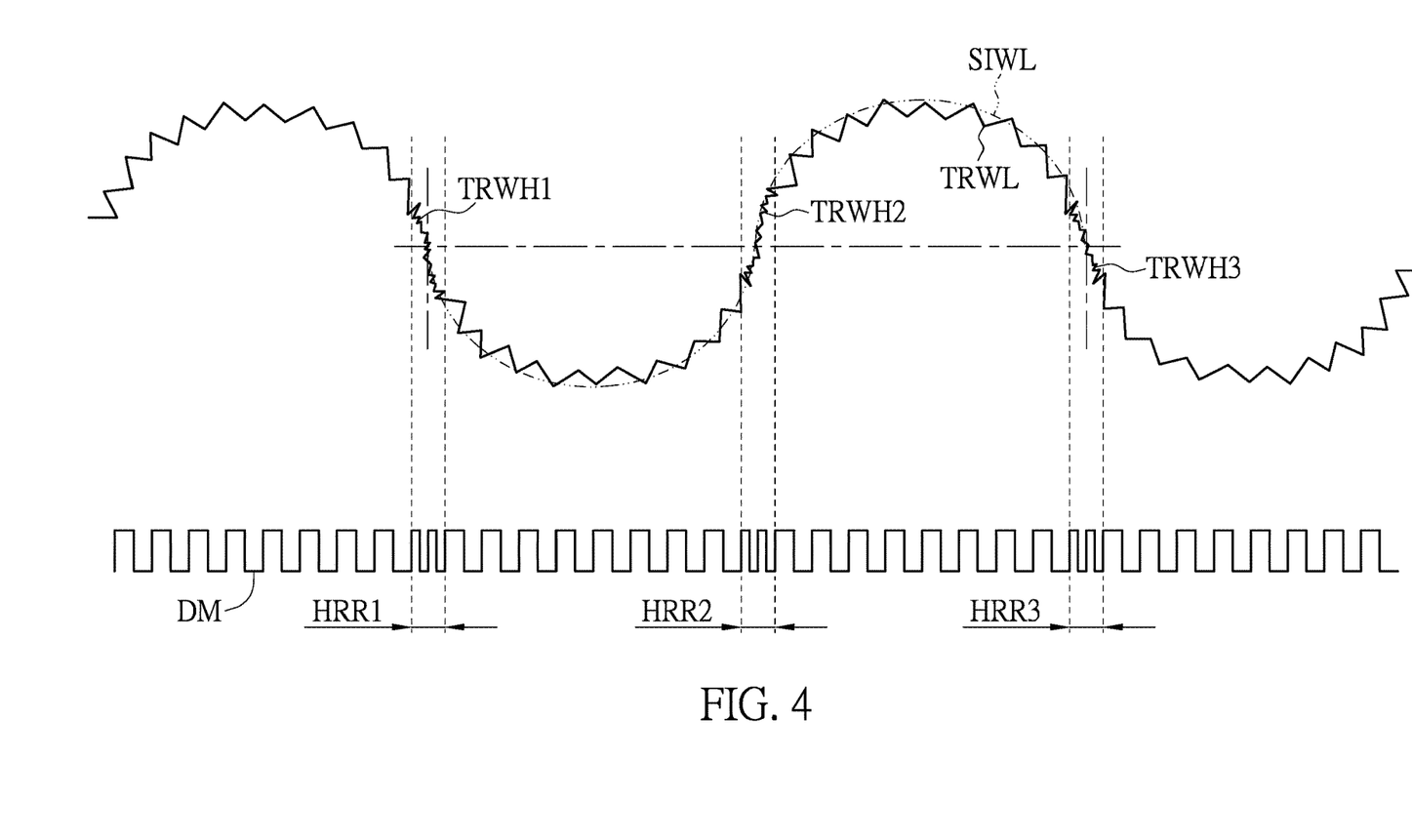
FIG. 4 is a waveform diagram of two cycles of a multi-frequency signal generated by modulating a frequency of an oscillating signal in a frequency modulation region by the system and method for driving the motor with the frequency conversion mechanism according to the embodiment of the present disclosure.

Reference is made to FIGS. 1 and 4, wherein FIG. 4 is a waveform diagram of two cycles of a multi-frequency signal generated by modulating a frequency of an oscillating signal in a frequency modulation region by the system and the method for driving the motor with the frequency conversion mechanism according to the embodiment of the present disclosure.

As shown in FIG. 4, a sine waveform of the preset driving signal SIWL stored in the look-up table module 10 corresponds to the triangular waveform of the low-frequency oscillating signal generated by the oscillating circuit 20. The multi-frequency signal generator circuit 30 may define frequency modulation regions HRR1, HHR2, and HRR3 on the sine waveform of the preset driving signal SIWL. In the embodiment, the frequency modulation regions HRR1, HHR2, and HRR3 have the same width, but in practice, they may be adjusted to have different widths according to requirements.

The multi-frequency signal generator circuit 30 may drive the motor at the high-frequency frequency of waveform segments TRWH1, TRWH2, and TRWH3 in the frequency modulation regions HRR1, HHR2, and HHR3 according to a frequency of the high-frequency oscillating signal generated by the oscillator circuit 20.

In addition, the multi-frequency signal generator circuit 30 may modulate the waveform segments TRWH1, TRWH2, and TRWH3 to have the same frequency according to a single high-frequency oscillating signal generated by the oscillator circuit 20. Alternatively, the multi-frequency signal generator circuit 30 may modulate the waveform segments TRWH1, TRWH2, and TRWH3 to have different frequencies from each other according to a plurality of high-frequency oscillating signals.

It should be understood that "high frequency" and "low frequency" used herein are relative terms. These terms are used to emphasize that a frequency of one waveform segment of the multi-frequency signal in the frequency modulation region is higher than the frequency of another waveform segment of the multi-frequency signal outside the frequency modulation region. That is, the frequency of the another waveform segment of the multi-frequency signal outside the frequency modulation region is lower than the frequency of one waveform segment of the multi-frequency signal in the frequency modulation region. These terms are not intended to limit the frequency of the multi-frequency signal to be modulated into a frequency within a specific immutable frequency range.

Figure 5:
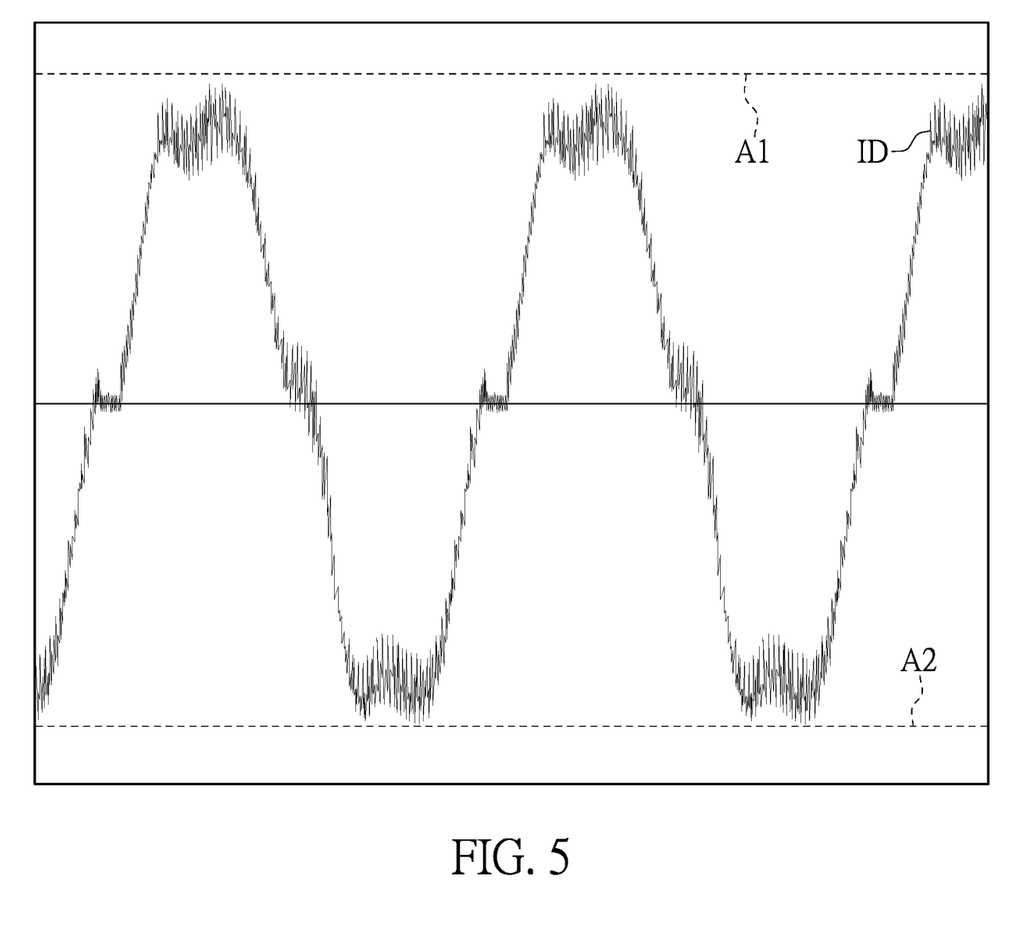
FIG. 5 is a waveform diagram of a current signal of the motor detected by the system and method for driving the motor with the frequency conversion mechanism according to the embodiment of the present disclosure.

Reference is made to FIG. 5, which is a waveform diagram of a current signal of the motor detected by the system and method for driving the motor with the frequency conversion mechanism according to the embodiment of the present disclosure.

A dotted line A1 shown in FIG. 5 indicates that current values of peaks of waveforms of an output current ID of the motor detected by the detector circuit are the same. A dotted line A2 shown in FIG. 5 indicates that current values of valleys of the waveforms of the output current ID of the motor detected by the detector circuit are the same.

The detector circuit detects the motor in the frequency modulation region (i.e., a waveform segment having a high frequency) of the driving signal with a higher detection frequency and a higher resolution than that in a waveform segment having a low frequency. That is, the detector circuit can perform a detection operation more times per unit time, and thus can accurately detect the current and the back electromotive force of the motor. After the detector circuit detects that the back electromotive force or the current of the motor reaches zero, the motor driver circuit may output the third-order harmonic waveform or the sine wave to the motor immediately, or wait for a predetermined time and then perform the operation.

Figure 7:
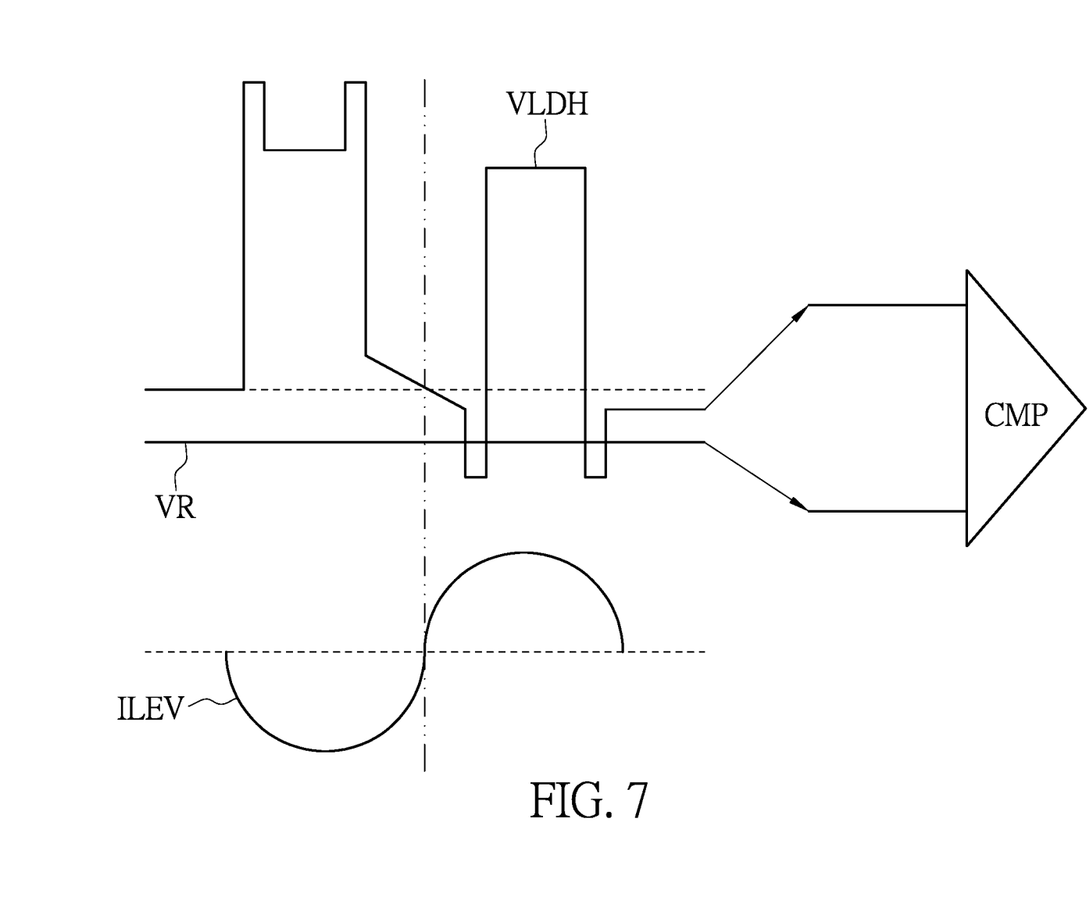
FIG. 7 is a waveform diagram of the node voltage signal and a current flowing direction signal of the motor implementing the system and method for driving the motor with the frequency conversion mechanism according to the embodiment of the present disclosure.

Reference is made to FIGS. 1, 6, and 7, wherein FIG. 6 is a waveform diagram of a triangular wave signal, a sine wave signal, a triangular wave level signal, a motor driving signal, and a node voltage signal of the motor that are provided by the system and method for driving the motor with the frequency conversion mechanism according to the embodiment of the present disclosure, and FIG. 7 is a waveform diagram of the node voltage signal and a current flowing direction signal of the motor implementing the system and method for driving the motor with the frequency conversion mechanism according to the embodiment of the present disclosure.

The oscillator circuit 20 shown in FIG. 1 may generate the first oscillating signal and the second oscillating signal. The multi-frequency signal generator circuit 30 shown in FIG. 1 generates the multi-frequency signal according to the first oscillating signal and the second oscillating signal. As shown in FIG. 6, the multi-frequency signal has a high-frequency waveform segment TRMH of a high oscillating frequency in the frequency modulation region WN, and has a low-frequency waveform segment TRML of a low oscillating frequency outside the frequency modulation region WN.

A falling edge of a low-frequency waveform segment TRLEL of the triangular wave level signal is aligned with a peak of the low-frequency waveform segment TRML of the multi-frequency signal. A falling edge of a high-frequency waveform segment TRLEH is aligned with a peak of the high-frequency waveform segment TRMH of the multi-frequency signal.

The motor driver circuit 40 compares the multi-frequency signal with a sine wave signal SIML to generate the driving signal to the motor to drive the motor to rotate. The driving signal has a high-frequency waveform segment DMTH of a high oscillating frequency in the frequency modulation region WN, and has a low-frequency waveform segment DMTL of a low oscillating frequency outside the frequency modulation region WN.

For example, the motor may be a three-phase motor, which includes a U phase, a V phase, and a W phase. The motor driver circuit 40 shown in FIG. 1 may include an upper bridge switch and a lower bridge switch of the U phase, an upper bridge switch and a lower bridge switch of the V phase, and an upper bridge switch and a lower bridge switch of the W phase. A node between the upper bridge switch and the lower bridge switch of the U phase is connected to one terminal of a coil of the U phase of the motor. A node between the upper bridge switch and the lower bridge switch of the V phase is connected to one terminal of a coil of the V phase of the motor. A node between the upper bridge switch and the lower bridge switch of the W phase is connected to one terminal of a coil of the W phase of the motor. Another terminal of the coil of the U phase, another terminal of the coil of the V phase, and another terminal of the coil of the W phase are connected to a common node.

The upper bridge switch and the lower bridge switch are switched within a switching time, which is also known as an invalid time or a dead time. Therefore, it can prevent a short circuit from occurring when the upper bridge switch and the lower bridge switch of the U phase, the V phase, or the W phase of the motor are turned on at the same time.

For example, when a current flows to the W phase from the V phase, a negative half-cycle of a waveform of a current flowing direction signal ILEV shown in FIG. 7 indicates that the current flows in a reverse direction for the W phase within the dead time. During this process, the current flows through an internal diode of the upper bridge switch of the W phase to an input voltage source connected to the upper bridge switch of the W phase. As a result, a high-frequency waveform segment VLDH of the node voltage signal in the frequency modulation region WN has a concave waveform as shown in FIGS. 6 and 7. This means that a voltage between the upper bridge switch and the lower bridge switch of the W phase is equal to a voltage such as 5.7V of the node voltage signal, and is equal to a sum of an output voltage of an input voltage source VCC such as 5V and a voltage of the internal diode such as 0.7V.

Conversely, when a current flows to the V phase from the W phase, a positive half-cycle of the waveform of the current flowing direction signal ILEV shown in FIG. 7 indicates that the current flows in a forward direction for the W phase within the dead time. During this process, the current flows through an internal diode of the lower bridge switch of the W phase to the V phase. When a current flows through the internal diode of the lower bridge switch of the W phase, the node voltage signal has a concave waveform in the high-frequency waveform segment VLDH of the frequency modulation region WN as shown in FIG. 6. This means that a voltage of a node between the upper bridge switch and the lower bridge switch of the W phase is equal to a voltage of the node voltage signal such as −0.7V, and is equal to the voltage of the internal diode such as 0.7V subtracted from a ground voltage GND such as 0V.

Therefore, the voltage of the node between the upper bridge switch and the lower bridge switch of the U phase, the V phase, or the W phase, is equal to the voltage of the node voltage signal and may be detected to determine a direction such as a reverse or forward direction, in which the current flows.

As shown in FIG. 7, in the embodiment, the system for driving the motor with the frequency conversion mechanism may further include a comparator CMP. A first input terminal of the comparator CMP is connected to the node between the upper bridge switch and the lower bridge switch of the U phase, the V phase, or the W phase and obtains the voltage of the node that is the voltage of the node voltage signal. In addition, the comparator CMP obtains a reference voltage VR from a reference voltage source. The comparator CMP may be configured to compare the voltage of the node that is the voltage of the node voltage signal such as −0.7V with a voltage of the reference voltage VR such as −0.35V to output a comparing signal. The motor driver circuit 40 shown in FIG. 1 controls the motor according to the comparing signal. It can be seen that, in a detection segment, a time point at which a waveform of a current is changed from concave to convex or from convex to concave is aligned with a time point at which the current reaches zero. As a result, zero information that is more accurate can be obtained by performing switching between the U phase, the V phase, and the W phase with a high switching frequency.

In summary, the present disclosure provides the system and method for driving the motor with the frequency conversion mechanism. The system uses the oscillator circuit to generate the plurality of oscillating signals having different frequencies, and outputs the multi-frequency signal having the high-frequency segment and the low-frequency segment according to the oscillating signals. The current and the back electromotive force of the motor are detected with the high detection frequency and the high detection resolution within the time interval of the high-frequency waveform segment. Therefore, the current and the back electromotive force can be detected accurately and instantaneously as parameter conditions for driving the motor, thereby improving the operating efficiency of the motor. When this detection operation is not performed, the low-frequency waveform segment is provided such that the switching loss and the power consumption can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for driving a motor with a frequency conversion mechanism, comprising:
   a look-up table module configured to store a preset driving signal;
   an oscillator circuit configured to generate a plurality of oscillating signals having different frequencies from each other;
   a multi-frequency signal generator circuit connected to the look-up table module and the oscillator circuit, and configured to transmit the preset driving signal and output a multi-frequency signal according to the oscillating signals, wherein one waveform segment of the multi-frequency signal in a frequency modulation region has a first oscillating frequency, and another waveform of the multi-frequency signal outside the frequency modulation region has a second oscillating frequency lower than the first oscillating frequency; and
   a motor driver circuit connected to the multi-frequency signal generator circuit, and configured to output a driving signal to the motor to drive the motor according to the preset driving signal and the multi-frequency signal when the motor driver circuit detects that a back electromotive force or a phase current of the motor reaches zero within a time interval of the frequency modulation region.

2. The system of claim 1, wherein the multi-frequency signal generator circuit is configured to redefine the frequency modulation region according to a region adjusting request.

3. The system of claim 1, further comprising:
   a detector circuit configured to detect the back electromotive force or the phase current of the motor within the time interval of the frequency modulation region.

4. The system of claim 3, wherein when the detector circuit detects that the back electromotive force or the phase current of the motor reaches zero at a time point in the frequency modulation region of the multi-frequency signal, the time point is spaced apart from a starting time point of the frequency modulation region by an angle on a waveform of the multi-frequency signal, and the time point is spaced apart from an ending time point of the frequency modulation region by the angle on the waveform of the multi-frequency signal.

5. A method for driving a motor with a frequency conversion mechanism, comprising the following steps:
    storing a preset driving signal by a look-up table module;
    generating a plurality of oscillating signals having different frequencies from each other by an oscillator circuit;
    outputting a multi-frequency signal according to the oscillating signals by a multi-frequency signal generator circuit, wherein one waveform segment of the multi-frequency signal in a frequency modulation region has a first oscillating frequency, and another waveform of the multi-frequency signal outside the frequency modulation region has a second oscillating frequency lower than the first oscillating frequency;
    transmitting the preset driving signal by the multi-frequency signal generator circuit; and
    outputting a driving signal, by a motor driver circuit, to drive the motor according to the preset driving signal and the multi-frequency signal when detecting that a back electromotive force or a phase current of the motor reaches zero within a time interval of the frequency modulation region.

6. The method of claim 5, further comprising the following step:
    redefining the frequency modulation region according to a region adjusting request by the multi-frequency signal generator circuit.

7. The method of claim 5, further comprising the following step:
    detecting the back electromotive force or the phase current of the motor within the time interval of the frequency modulation region by a detector circuit.

8. The method of claim 5, further comprising the following step:
    detecting that the back electromotive force or the phase current of the motor reaches zero at a time point in the frequency modulation region of the multi-frequency signal by a detector circuit, wherein the time point is spaced apart from a starting time point of the frequency modulation region by an angle on a waveform of the multi-frequency signal, and the time point is spaced apart from an ending time point of the frequency modulation region by the angle on the waveform of the multi-frequency signal.

* * * * *